April 8, 1958        N. M. VALLI        2,829,488
METHOD OF MANUFACTURING AND ASSEMBLING EXPANSION LINK
BANDS BY SUPERIMPOSING LINK CARRYING STRIPS
Filed Feb. 12, 1957
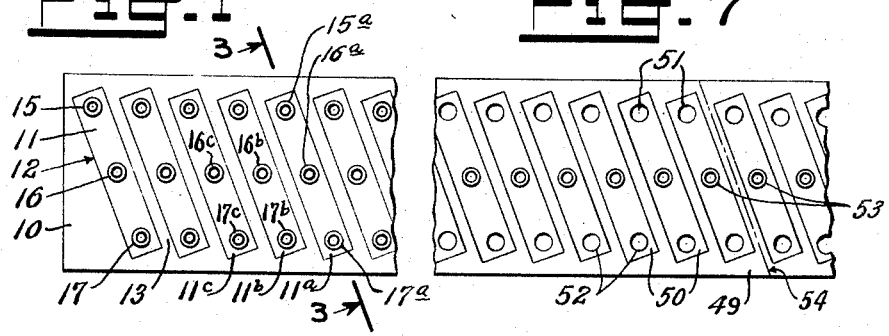
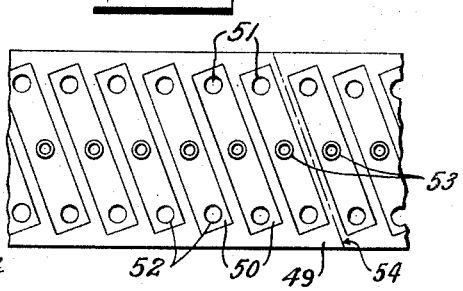
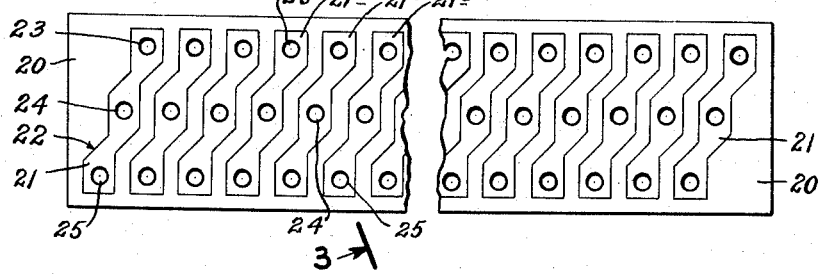
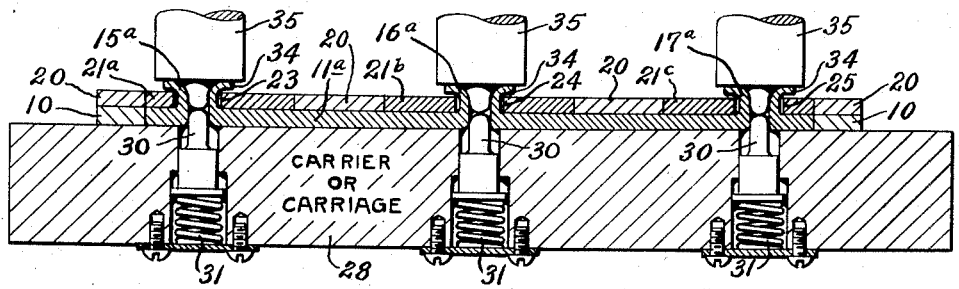
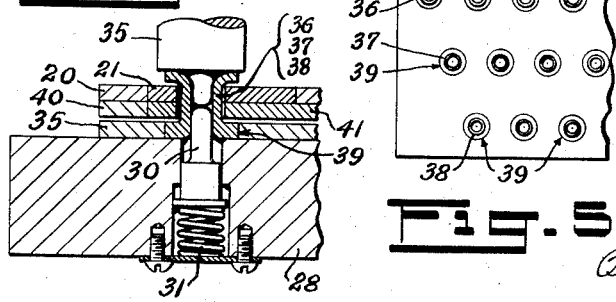
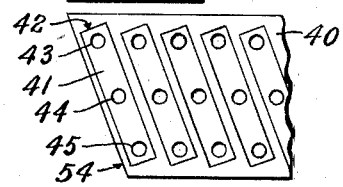
INVENTOR.
NICHOLAS M. VALLI
BY
Bohleber, Jacett & Montstream
ATTORNEYS

United States Patent Office 2,829,488
Patented Apr. 8, 1958

2,829,488

METHOD OF MANUFACTURING AND ASSEMBLING EXPANSION LINK BANDS BY SUPERIMPOSING LINK CARRYING STRIPS

Nicholas M. Valli, Valley Stream, N. Y.

Application February 12, 1957, Serial No. 639,774

10 Claims. (Cl. 59—35)

The invention relates to a method of manufacturing and assembly of expansion link bands. Such bands are commonly used in the jewelry trade although they have general applicability. Such bands include a plurality of links in which each link, except the end or terminal links are pivotally connected with three adjacent links so that with a series of links, an expansible and contractible band is provided. In bands used in the jewelry trade, such as wrist watch bands, a spring is customarily provided between links so that the band is normally resiliently contracted.

It is an object of the invention to provide a new and novel method of manufacture and assembly of expansion linked bands.

More particularly it is an object of the invention to provide a method of manufacture and assembly of expansion linked bands in which a set of first links is punched in one ribbon of metal and each link reinserted or retained in its recess and a second series of cooperating links is punched from a second ribbon of metal and each link is reinserted or retained in its recess with the pivot points or axes of the links of one ribbon of metal corresponding with the pivot points or axes of the links in the other ribbon of metal so that the two ribbons carrying their respective links may be placed one on top of the other with respective pivots of one link being in exact correspondence with the pivots of the links in other ribbon whereupon the links may be positioned in assembly relation after which the links are pivotally secured together. The waste portion of each band may be stripped either when in assembled relation before or after the links are secured together.

It is another object of the invention to provide a method of manufacture and assembly of expansion link bands as above in which one or more of the pivot connecting means may be integral with one of the links or this means may be a separate part.

Other objects of the invention will be more apparent from the following description when taken in connection with the accompanying drawings illustrating preferred embodiments thereof in which, Fig. 1 is an enlarged view of a ribbon of metal having a plurality of first links punched or pressed therefrom which are retained or pressed back in the recess formed in the band and retained therein.

Fig. 2 is an enlarged view of the cooperating links which have been punched or pressed from a second ribbon of metal and retained or repressed back into recesses and retained therein.

Fig. 3 shows a carrier or carriage in enlarged view upon which the ribbons of Figs. 1 and 2 are positioned and with the end of the pivot connecting means spread to pivotally lock the links together.

Fig. 4 is a partial view of the carrier or carriage in which a separate pivot connecting means is used.

Fig. 5 is a partial view of a ribbon or strip of metal showing separate pivot connecting means or eyelets punched therefrom and pressed into the recesses formed in the ribbon and spaced corresponding with the location of the pivot holes of the links in their own ribbons of metal.

Fig. 6 is a partial view of a ribbon of first links to be used with separate eyelets.

Fig. 7 is a partial view of a ribbon of first links in which the ends have eyelet receiving holes for separate eyelets.

In the manufacture and assembly of expansion linked bands as presently practised, the links are pressed or punched out of a ribbon of metal and separated therefrom. An assembler then takes each separate first link and mounts it on locating pins carried by a carrier provided for assembling the links. Each separate cooperating link is then individually mounted on the locating pins of the assembly carriage or on the eyelets of the first links. The ends of the pivot connecting means or eyelets are then spread outwardly to pivotally retain the links in assembled relation. This individual manipulation of each link onto a carrier is time-consuming and substantially increases the cost of the manufacture and particularly of assembly of linked bands. With applicant's method, a whole series of first links are assembled on the carrier at one time with the links retained in the ribbon and a whole series of a cooperating links is asembled at one time on the carrier with the links retained in the ribbon. The ends of the pivot connecting means or eyelets are then spread so that the links are assembled together. The waste material holding the links may be stripped from the links either before or after the spreading of the end of the pivot connecting means, however, the simpler method is to strip the waste from the links after they are connected together. The same process of manufacture and assembly is used when separate pivot connecting means or eyelets are provided as will be described.

In Fig. 1 a strip of metal 10 has a plurality of first links 11 which have been punched therefrom and leaving a recess 12 for each link in the ribbon. The links are spaced from each other so that there is a strip 13 of metal between each link. In the construction shown in Fig. 1 a pivot connecting means or eyelets 15, 16 and 17 are formed integrally with the link. There are shown three eyelets provided for each link in spaced relation, one being at one end, one at the center and one at the other end. The first links of Fig. 1 are shown inclined at an angle so that a narrow strip of the metal ribbon will be provided between each link. These links when assembled can be and more frequently are vertically positioned when assembled so that the appearance of the link band is a series of parallel links extending at right angles to the length or longitudinal axis of the band.

A plurality of cooperating links are punched or pressed from a second ribbon 20 as shown in Fig. 2. Each cooperating link 21 is punched out and repressed back into the recess 22 formed in the band so that the links are held in the ribbon of metal. Each link has three spaced connecting holes 23, 24 and 25 in which the hole 23 corresponds in location or position with the pivot connecting means 15a of one first link and the connecting hole 24 corresponds in position or location with the pivot connecting means 16b of the next adjacent first link 11b and connecting hole 25 corresponds in position or location with the pivot connecting means 17c with the third adjacent link 11c. The same relationship exists with respect to each of the cooperating links. These cooperating links may be of any form, the zig-zag form particularly illustrated providing a convenient form for attachment of spring means for contracting the band in finished form and enabling the first links to assume a right angle relation when contracted in the assembled band.

In assembling the plurality of links of Figs. 1 and 2, a carrier or carriage 28 is used having locating means of any suitable form carried thereby. In the carrier of Fig. 3 a series of locating pins 30 are depressably mounted in the carrier and each locating pin is pressed into upward position by a spring 31. There is one locating means preferably provided for each pivoted joint in all of the links. In assembling the links, the ribbon 10 with its plurality of links held in the recesses of the ribbon is placed as a unit onto the carrier with the eyelets which are integral with the first links 11 being received by the locating pins 30. The ribbon 20 with its plurality of cooperating links retained in the recesses of the ribbon is then placed over the band 10 on the carrier and since the connecting holes 23, 24 and 25 for each link are located and spaced to correspond with the eyelets or pivot connecting means of each series of three adjacent first links of Fig. 1, the respective holes will be received on the pivot connecting means of their respective first links.

After the ribbons of links are placed in position the ends 34 of the eyelets are pressed over to lock or retain the links assembled together and free to pivot. This pressing over may be accomplished in any suitable way such as by punches 35. After the links have been secured together, the waste portion of each ribbon may be stripped by hand from the assembled links. As a matter of fact after the links have been assembled on the carrier the waste portion may be stripped since the links have been located as a unit in position on the carrier and they are retained in position by the locating means. It is more convenient, however, to strip the waste portion after the links have been assembled together.

It is not necessary that the pivot connecting means or eyelets be integral with the first links. Figs. 4, 5 and 6 show a construction in which separate eyelets are used. In Fig. 5 a ribbon of metal 35 has punched or pressed thereinto a plurality of separate eyelets or pivot connecting means 36, 37 and 38 which are positioned on the ribbon to correspond with the positions of the cooperating holes in the first links. Each of these eyelets are pressed back into its respective recess 39 in the ribbon so that the eyelets are removably retained therein.

A ribbon 40 shown in Fig. 6 has a plurality of first links 41 pressed or punched therein which are then pressed back into the recesses 42 so that the links are retained in the ribbon. These links have three spaced connecting holes 43, 44 and 45, one hole being at one end, the second hole being in the center and the third hole being at the other end of the link. With this construction and method the ribbon 20 of Fig. 2 with the links punched and repressed into the recesses is used therewith.

In this method of manufacture and construction, the ribbon 35 with its retained eyelets is placed on the carrier 28 with each locating pin 30 receiving an eyelet. The ribbon 40 containing a series of first links 41 is placed thereover so that the connecting holes 43, 44 and 45 of each link are received upon an eyelet. The ribbon 20 of Fig. 2 with its cooperating links is then placed on top of the ribbon 40. This places the links in proper position since the axes of the pivot connecting means, the connecting holes of the links of the ribbon 40 and the connecting holes of the links in the ribbon 20 are all identically spaced and located or positioned. The end 46 of the pivot connecting means or eyelet is then spread to pivotally retain the links on the connecting means. The waste portion of each ribbon may then be stripped off leaving the links in assembled relation.

It is not necessary that the first link have integral eyelets or separate eyelets at each pivot. In Fig. 7 a ribbon is shown in which the center eyelet is integral and the end eyelets may be separate. The ribbon 49 of metal has a plurality of links 50 in which the ends carry eyelet receiving holes 51 and 52 and a central integral eyelet 53. In this form the ribbon 35 has separate and separable eyelets 36 and 38 only. It is clear that the ends may have integral eyelets and the center may have a separate eyelet in which case a narrow ribbon containing only center eyelets is used. The manufacture is as described in the other forms.

In the methods of manufacture and assembly described, a pivot connecting means or eyelet is provided whether or not this means is integral with the first links or whether an independent and separate eyelet is used as shown in the form of Figs. 4 through 7. It is clear too that the eyelets need not be formed on a ribbon 35, as preferred, but these eyelets may be formed in any manner after which they may be manually or otherwise placed in position of the locating means 30 on the carrier. The ribbon 40 having the first links may then be assembled onto the eyelets as described after which the ribbon 20 is placed thereover with the connecting holes 43, 44 and 45 being received on its respective eyelet since their axes are positioned to correspond with the position of the eyelets on the carrier and to correspond with the connecting holes of the first and cooperating links.

The ribbons of links may be punched in separate bands of the length of the finished band. Usually, however, they are progressively punched in a long ribbon and the ribbon of band length cut from the long ribbon such as on a diagonal cut 54 between links.

This invention is presented to fill a need for improvements in a method of manufacturing and assembling expansion link bands. It is understood that various modifications in structure, as well as changes in mode of operation, assembly, and manner of use, may and often do occur to those skilled in the art especially after benefitting from the teachings of an invention. Hence, it will be understood that this disclosure is illustrative of preferred means of embodying the invention in useful form by explaining the construction, operation and advantages thereof.

What is claimed is:

1. A method of manufacturing and assembling expansion link bands using a carrier having spaced locating means comprising punching out a series of first links from a ribbon of metal and pressing the links back into the recesses formed in the waste portion where they are held, providing three pivot connecting means for each of the first links in spaced relation, punching out a series of cooperating links from a ribbon of metal in crossed relation with respect to three adjacent first links in its ribbon and pressing the links back into the recesses formed in the waste portion where they are held, each cooperating link being punched with three connecting holes located and spaced corresponding to the interengaging relation of the pivot connecting means of three adjacent first links in its ribbon, placing the pivot connecting means and ribbon of first links on a carrier having locating means for the pivot connecting means, placing the ribbon of cooperating links over the ribbon of the first links with the connecting holes receiving the pivot connecting means, spreading the ends of the pivot connecting means to fasten the links together for pivotal movement, and stripping off the waste portion of each ribbon after positioning the same on the carrier.

2. A method as in claim 1 in which the punching of the first links includes punching pivot connecting means integral with the links.

3. A method as in claim 1 in which the punching of connecting means in the first links is punching of at least one hole; including punching eyelets in a third ribbon of metal spaced and located to correspond with the spacing of the connecting holes of the first links and pressing the eyelets into respective recesses formed in the waste portion, and placing the third ribbon on the carrier first whereby the other ribbbons overlie the third ribbon, and stripping off the waste portion after the eyelets have been placed on the carrier.

4. A method as in claim 1 in which the punching of connecting means in the first links is punching a plurality of holes.

5. A method of manufacturing and assembling expansion link bands using a carrier having spaced locating means comprising punching out a series of first links from a ribbon of metal with three spaced pivot connecting means integral therewith and pressing the links back into the recesses formed in the waste portion where they are held, punching out a series of cooperating links from a ribbon of metal and pressing the links back into the recesses formed in the waste portion where they are held, each cooperating link being punched with connecting holes located and spaced corresponding to the interengaging relation of the spaced pivot connecting means of three adjacent first links in its ribbon, placing the ribbon of first links on the locating means for the pivot connecting means on the carrier, placing the ribbon of cooperating links over the ribbon of the first links with the connecting holes receiving the pivot connecting means, spreading the ends of the pivot connecting means to fasten the links together for pivotal movement, and stripping off the waste portions of each ribbon after positioning the same on the carrier.

6. A method of manufacturing and assembling expansion link bands using a carrier having spaced locating means comprising punching out a series of first links from a ribbon of metal with at least one spaced pivot connecting means integral therewith and pressing the links back into the recesses formed in the waste portion where they are held, punching out a series of cooperating links from a ribbon of metal and pressing the links back into the recesses formed in the waste portion where they are held, each cooperating link being punched with connecting holes located and spaced corresponding to the interengaging relation of the spaced pivot connecting means of three adjacent first links in its ribbon, mounting separate pivot connecting means on the locating means of the carrier for each first link at each pivot point lacking an integral pivot connecting means, placing the ribbon of first links on the locating means for the pivot connecting means on the carrier, placing the ribbon of cooperating links over the ribbon of the first links with the connecting holes receiving the pivot connecting means, spreading the ends of all of the pivot connecting means to fasten the links together for pivotal movement, and stripping off the waste portions of each ribbon after positioning the same on the carrier.

7. A method of manufacturing and assembling expansion link bands using a carrier having spaced locating means comprising punching out a series of first links from a ribbon of metal with at least one spaced pivot connecting means integral therewith and pressing the links back into the recess formed in the waste portion where they are held, each first link having a connecting hole for each pivot position lacking an integral pivot connecting means, punching out a series of cooperating links from a ribbon of metal and pressing the links back into the recess formed in the waste portion where they are held, each cooperating link being punched with connecting holes located and spaced corresponding to the interengaging relation of the spaced pivot connecting means of three adjacent first links in its ribbon, punching separate pivot connecting means from a ribbon of metal for each first link lacking an integral connecting means and pressing the connecting means back into the recess formed in the waste portion where they are held, the pivot connecting means being spaced corresponding to the interengaging relation of the pivot points of the first links which lack an integral pivot connecting means, placing the ribbon of separate pivot connecting means on the locating means of the carrier, placing the ribbon of first links on the locating means for the pivot connecting means and on the separate connecting means on the carrier, placing the ribbon of cooperating links over the ribbon of the first links with the connecting holes receiving the pivot connecting means, spreading the ends of the pivot connecting means to fasten the links together for pivotal movement, and stripping off the waste portions of each ribbon after positioning the same on the carrier.

8. A method of manufacturing and assembling expansion link bands using a carrier having spaced locating means comprising punching out a series of first links from a ribbon of metal with a plurality of spaced connecting holes in each link and pressing the links back into the recess formed in the waste portion where they are held, punching out a series of cooperating links from a ribbon of metal and pressing the links back into the recess formed in the waste portion where they are held, each cooperating link being punched with connecting holes located and spaced corresponding to the interengaging relation of the spaced connecting holes of three adjacent first links in its ribbon, mounting separate pivot connecting means on the carrier for each connecting hole in all of the first links, placing the ribbon of first links with each connecting hole receiving a pivot connecting means, placing the ribbon of cooperating links over the ribbon of the first links with the connecting holes receiving the pivot connecting means, spreading the ends of the pivot connecting means to fasten the links together for pivotal movement, and stripping off the waste portions of each ribbon after positioning the same on the carrier.

9. A method of manufacturing and assembling expansion link bands using a carrier having spaced locating means comprising punching out a series of first links from a ribbon of metal with spaced connecting holes therein and pressing the links back into the recess formed in the waste portion where they are held, punching out a series of cooperating links from a ribbon of metal and pressing the links back into the recess formed in the waste portion where they are held, each cooperating link being punched with connecting holes located and spaced corresponding to the interengaging relation of the spaced connecting holes of three adjacent first links in its ribbon, punching separate pivot connecting means from a ribbon of metal for each connecting hole in the plurality of first links and pressing the connecting means back into the recess formed in the waste portion where they are held, the pivot connecting means being spaced corresponding to the interengaging relation of the connecting holes of the first links, placing the ribbon of separate pivot connecting means on the locating means of the carrier, placing the ribbon of first links over the ribbon for the pivot connecting means with the connecting holes receiving the pivot connecting means on the carrier, placing the ribbon of cooperating links over the ribbon of the first links with the connecting holes receiving the pivot connecting means, spreading the ends of the pivot connecting means to fasten the links together for pivotal movement, and stripping off the waste portions of each ribbon after positioning the same on the carrier.

10. A method of manufacturing and assembling expansion link bands using a carrier having spaced locating means comprising punching out a series of first links from a ribbon of metal and pressing the links back into the recesses formed in the waste portion where they are held, providing a plurality of pivot connecting means for each of the first links in spaced relation, punching out a series of cooperating links from a ribbon of metal and pressing the links back into the recesses formed in the waste portion where they are held, each cooperating link being punched with connecting holes located and spaced corresponding to the interengaging relation of the spaced pivot connecting means of a plurality of adjacent first links in its ribbon, placing the ribbon of first links on the locating means for the pivot connecting means on the carrier, placing the ribbon of cooperating links over the ribbon of the first links with the connecting holes receiving the pivot connecting means, spreading the ends of all of the pivot connecting means to fasten the links together for pivotal movement, and stripping off the waste portions of each ribbon after positioning the same on the carrier.

No references cited.